United States Patent [19]

Sullivan

[11] 4,317,165

[45] Feb. 23, 1982

[54] INVERTER HAVING IMPROVED EFFICIENCY AND REGULATION

[75] Inventor: James D. Sullivan, Grove City, Ohio

[73] Assignee: Vanner, Inc., Columbus, Ohio

[21] Appl. No.: 160,555

[22] Filed: Jun. 17, 1980

[51] Int. Cl.³ .............................................. H02M 1/12
[52] U.S. Cl. .......................................... 363/41; 363/97
[58] Field of Search ................... 331/114; 363/97, 41, 363/133, 134

[56] References Cited

U.S. PATENT DOCUMENTS

| | | | |
|---|---|---|---|
| 3,067,378 | 12/1962 | Paynter | 363/97 |
| 3,706,925 | 12/1972 | Engelhardt | 363/134 X |
| 3,946,301 | 3/1976 | Love | 363/134 |
| 4,067,057 | 1/1978 | Taddeo et al. | 363/97 X |

Primary Examiner—William M. Shoop
Attorney, Agent, or Firm—Frank H. Foster

[57] ABSTRACT

An inverter circuit is disclosed in which the efficiency of the inverter is improved by interposing a small transformer winding between the transistors in a Darlington pair which are used to switch the primary current of the inverter. The winding couples energy from the transformer into the Darlington pair at a polarity which opposes the characteristic junction potential of the output transistor. This substantially reduces the saturation voltage of this output transistor. The regulation of the output voltage is improved by detecting the RMS value of the output voltage and using the detected RMS value of the output voltage for controlling the width of pulses applied to the primary of the transformer of the inverter.

11 Claims, 13 Drawing Figures

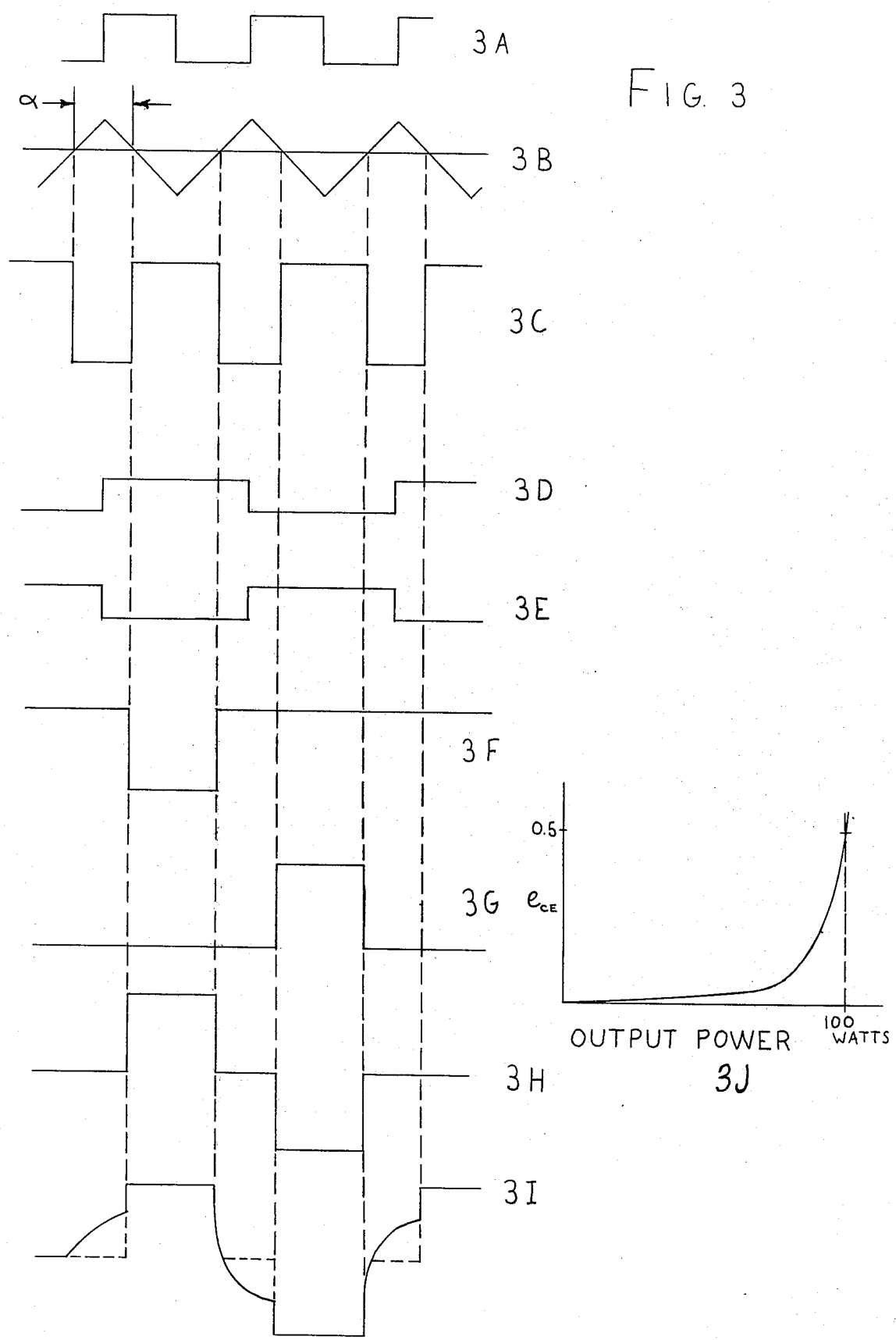

INVERTER HAVING IMPROVED EFFICIENCY AND REGULATION

TECHNICAL FIELD

This invention relates generally to electrical power circuitry and more particularly relates to an inverter circuit for inverting a DC voltage, for example of 12 volts, to an AC voltage, for example of 120 volts at 60 Hz. Such inverters are used to provide power for operating equipment which was designed to be powered by conventional alternating power with energy derived from a DC source such as the storage battery of a vehicle.

BACKGROUND ART

Prior inventors have designed a wide variety of inverter circuits. Inverter circuits are often found as a part of converter circuits which convert a DC voltage at a first amplitude to a DC voltage at another amplitude by intermediately converting the energy to periodic alternating current for accomplishing voltage level changes with a transformer.

Although inverter circuits may be single ended, for high power applications, e.g. exceeding 200 watts, conventionally they are of the push-pull type having a center tapped transformer. A DC source is connected to the center tap of the transformer and a pair of push-pull connected electronic switching means are connected to the ends of the primary for alternately applying the DC source to opposite halves of the primary. The electronic switching means are controlled by a control means connected to their inputs. The AC power is taken from the transformer secondary.

One problem with such inverter circuits is the power losses in the electronic switching devices which switch the primary current. These losses lower the efficiency of the circuit especially at high loads. A major cause of such power loss is the heat generated at the junctions of the switching device, such as a bipolar transistor, which is used to alternately switch the DC current through the transformer primary.

For example, a transistor typically may have a saturation voltage of 0.7 volts. If a 1,000 watt load is connected to the 120 volt output then a 12 volt DC source must supply at least 100 amps resulting in a junction loss of at least 70 watts.

Darlington connected transistor pairs have been popular as the switching elements for inverter circuits because their high gain permits use of very low switching power. However, a conventional Darlington pair has a saturation voltage twice that of a single stage device. For example, with reference to the above example, a 1,000 watt AC load would result in 140 watts of dissipation in the switching transistor.

There is therefore a need for a circuit for substantially reducing the dissipation and therefore increasing the efficiency of Darlington pair inverter circuits so that the high gain advantages of the Darlington pair can be utilized without the disadvantage of increased saturation losses and its resultant lower efficiency.

Inverter circuits which provide a useful AC power source require some regulation in order to maintain a constant output voltage over a wide range of load current.

Many types of regulation circuits are illustrated in the prior art. One type uses a pulse width modulation technique in which the width of the current pulses applied to the transformer is modulated to maintain a constant average AC output voltage as loading changes. In such a circuit the pulse width is responsive to the difference between a reference level and a signal which is derived and fed back from the AC output at the transformer secondary.

However, I have discovered that a defect exists in the prior art circuits because the signals which they feed back are not accurately proportional to the actual desired output condition which is to be regulated and maintained constant. In particular, prior art circuits feed back on AC signal which is proportional to the output, rectify it and then filter it to obtain its average value. However, it is RMS value of the output which should be regulated.

For a perfectly sinusoidal AC output voltage, the average signal obtained in that way is proportional to the RMS value of the AC output voltage. Therefore, for sinusoidal waveforms the average value may be used to regulate RMS value of the output because they are proportional. Of course, with a converter, in which a DC output is used, there is no problem. However, when pulse width modulation techniques are used and the output is AC, the distortion away from a sinusoid is substantial. Additionally, distortion of the output waveform changes as loading changes. With this distortion, the RMS value of the output is not proportional to the detected average value. Thus, the prior art circuits operate to regulate the average value and allows the RMS value to change. Since the equipment which is to be powered by the AC output is responsive to the RMS values, effective regulation is not maintained. For example, the RMS value of an AC output may vary by as much as 10% as loading increases even though the average value of the output voltage may be relatively constant.

BRIEF SUMMARY OF THE INVENTION

The invention involves the interposing of a small transformer winding between the transistors in the Darlington pair which switch the primary current. These windings connect the emitter of the input transistor to the base of the output transistor of the pair. The winding is magnetically linked to the transformer and couples energy from the transformer into the Darlington pair at a polarity which opposes the characteristic junction potential of the transistors of the Darlington pair.

The major result of this is that the emitter to collector voltage at saturation of the output switching transistor is substantially reduced and is effectively zero under minimal loading. Power dissipation is therefore reduced. At maximum load the collector to emitter voltage is typically 0.5. Another major advantage is that switching speed is improved because this coupling provides energy which is positive feedback. Furthermore, an additional advantage is that as output power demand or loading increases, the switching drive current is also increased. Consequently, the addition of the energy coupled into the Darlington pair not only greatly improves the efficiency of the circuit by decreasing the power losses in the switching transistors but additionally switching is faster in switching each drive transistor both on and off.

Because of the faster switching and increased switching drive, the switching transistors may be of a less expensive type which have greater junction capacitance and will still switch effectively.

Regulation is greatly improved by detecting a signal which is proportional to the RMS value of the output voltage. This signal is then compared to a reference signal and the difference used to modulate the pulse width of the pulses applied to the primary of the transformer.

BRIEF DESCRIPTIONS OF THE DRAWINGS

FIGS. 3A to 3I are oscillograms illustrating the operation of the circuit of FIG. 2.

DESCRIPTION OF THE PREFERRED EMBODIMENT

Figure 1:
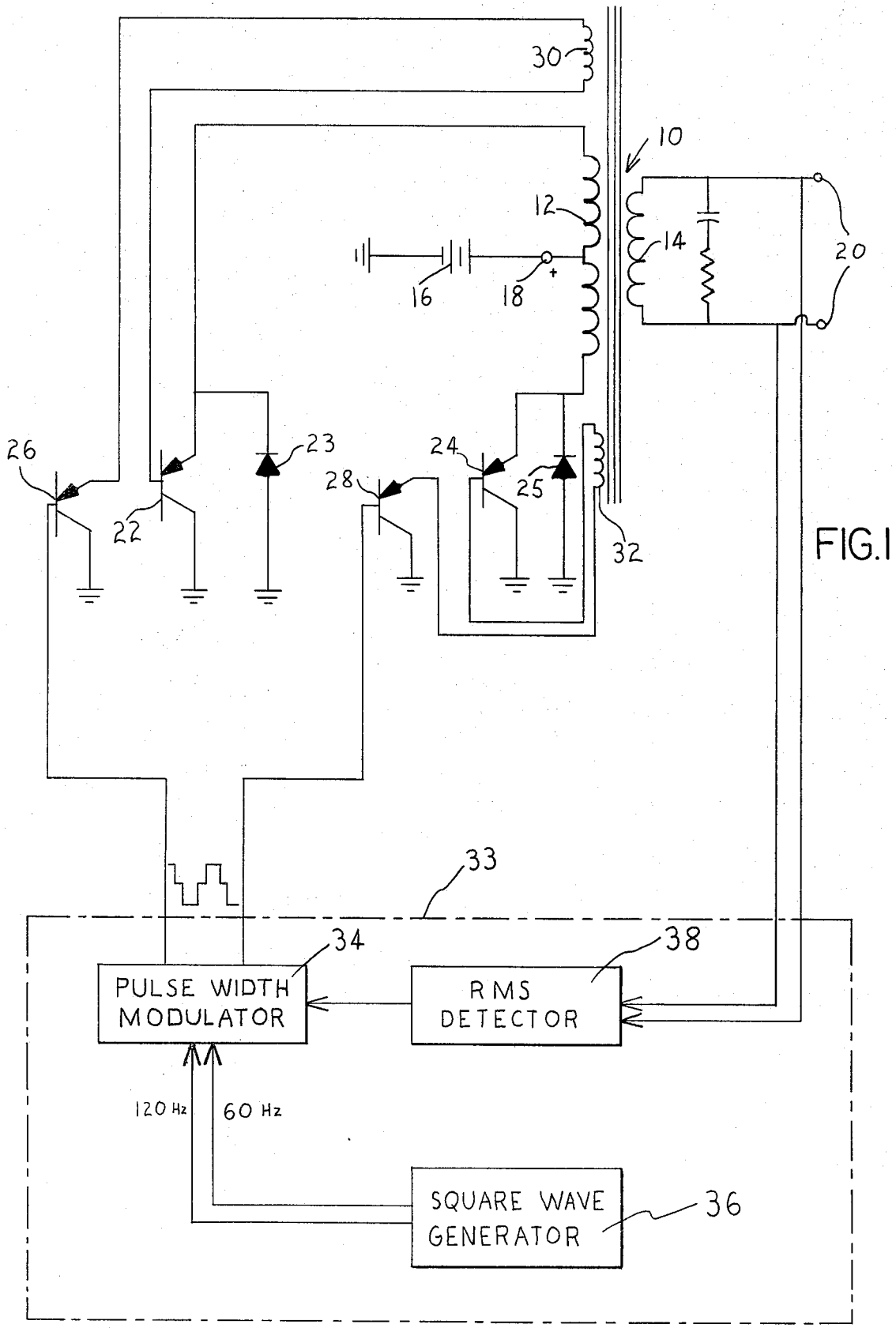
FIG. 1 is a simplified schematic diagram illustrating the operation of the preferred embodiment of the invention.

FIG. 1 is a simplified diagram illustrating the preferred embodiment of the invention. The inverter of FIG. 1 has a power transformer 10 including a center tapped primary 12 and a secondary 14. A DC source 16, such as a 12 volt storage battery, is connected to the center tap 18 of the primary 12 and to ground. This circuit converts the DC voltage of the voltage source 16 to an alternating output voltage at the output terminals 20.

The DC voltage of the DC source 16 is periodically applied to the primary 12 through bipolar transistor switches 22 and 24. These switches 22 and 24 operate alternately to apply the DC potential at first to one-half of the primary, to supply primary current in one direction, and then on the opposite half cycle to the other half of the primary to supply DC current in the opposite direction.

In the preferred embodiment, the transistor switches 22 and 24 are actually the second or output transistor of a Darlington pair formed with their associated input transistors 26 and 28 and connected in a common collector configuration. The two transistors of the Darlington pair are connected by means of a small winding connected between the first or input transistor of each Darlington pair and the base of the second or output transistor. The emitter of transistor 26 is connected through winding 30 to the base of transistor 22 and similarly the emitter of transistor 28 is connected through winding 32 to the base of transistor 24.

In the preferred embodiment, the windings 30 and 32 are wound on the power transformer 10 so that they are magnetically coupled to the magnetic flux of the transformer. The purpose of the winding is to provide an offsetting voltage source which is sufficient to drive the base of the output switching transistor below ground in the common collector configuration to minimize the saturation voltage. The offsetting voltage source has a magnitude dependent upon the usual transformer parameters of turns ratio and magnetic coupling and the amplitude of the DC voltage source 16. The windings 30 and 32 are connected at a polarity to oppose the base emitter junction voltage of the switching means to reduce the emitter to collector voltage across the switching means.

In the preferred embodiment which utilizes Darlington pairs, the offsetting voltage is made equal to the sum of the base emitter junction voltages of two transistors of the Darlington pair. The desired voltage is obtained by selecting the number of turns of this winding to provide the turns ratio which will give the selected winding voltage at a selected operating point or condition. For example, a preferred operating point is a 120 volt RMS output voltage at output terminal 20 with no external loading.

However, it is possible within the spirit of the invention to utilize separate transformers having both a primary and secondary to provide this offset voltage source by selecting appropriate turns ratios and other conventional transformer design parameters. A separate transformer may be used in either the primary or secondary circuit.

The windings 30 and 32 are not utilized to drive or switch the switching transistors in the sense that they do not initiate or control the switching. That is done by the control circuit 33 described below. Rather, the current from these windings is added to the bias current. It is designed to provide the selected offset voltage at a polarity opposite to that of the base emitter voltages and in amplitude equal to the base emitter voltages or voltage if a single transistor is utilized.

Each output transistor 22 and 24 is also shunted by its respective diode 23 and 25 which provides a current path when its associated transistor is turned off and there is a resulting magnetic field collapse in the associated half of the primary. Even more importantly these diodes simultaneously provide a conduction path which allows energy from an inductive load to be coupled back into the battery source 16.

The inputs to transistors 26 and 28 are control inputs connected to a control circuit means indicated generally as 33. The control circuit means 33 controls the switching of the switching means formed by the two Darlington pairs.

The control means 33 includes a square wave generator 36. The square wave output from the square wave generator 36 has its width modulated by the pulse width modulator 34 in order to maintain a constant AC output voltage at the output terminals 20 over a wide range of operating current. The pulse width modulator 34 is designed and adjusted to provide a selected output pulse width at a desired operating point and the width is then modulated by the output from RMS detector 38. The operating point may, for example, be at 120 volts RMS AC output voltage with a pulse width of 120°.

Wider pulses from the pulse width modulator 34 increase the on time of the transistors 22 and 24 and consequently increase the RMS output voltage of the transformer 10.

The RMS detector circuit 38 has its input connected to the output 20 at the secondary of the transformer 10. The output of the RMS detector provides a feedback signal which has an amplitude or level which is proportional to the RMS value of the output voltage at the output terminals 20. Thus, the pulse width is modulated about an operating point by any variations in the RMS value of the output voltage at the output terminals 20. This is a negative feedback loop which stabilizes the output voltage at a selected, regulated value in accordance with feedback control principles.

Figure 2A:
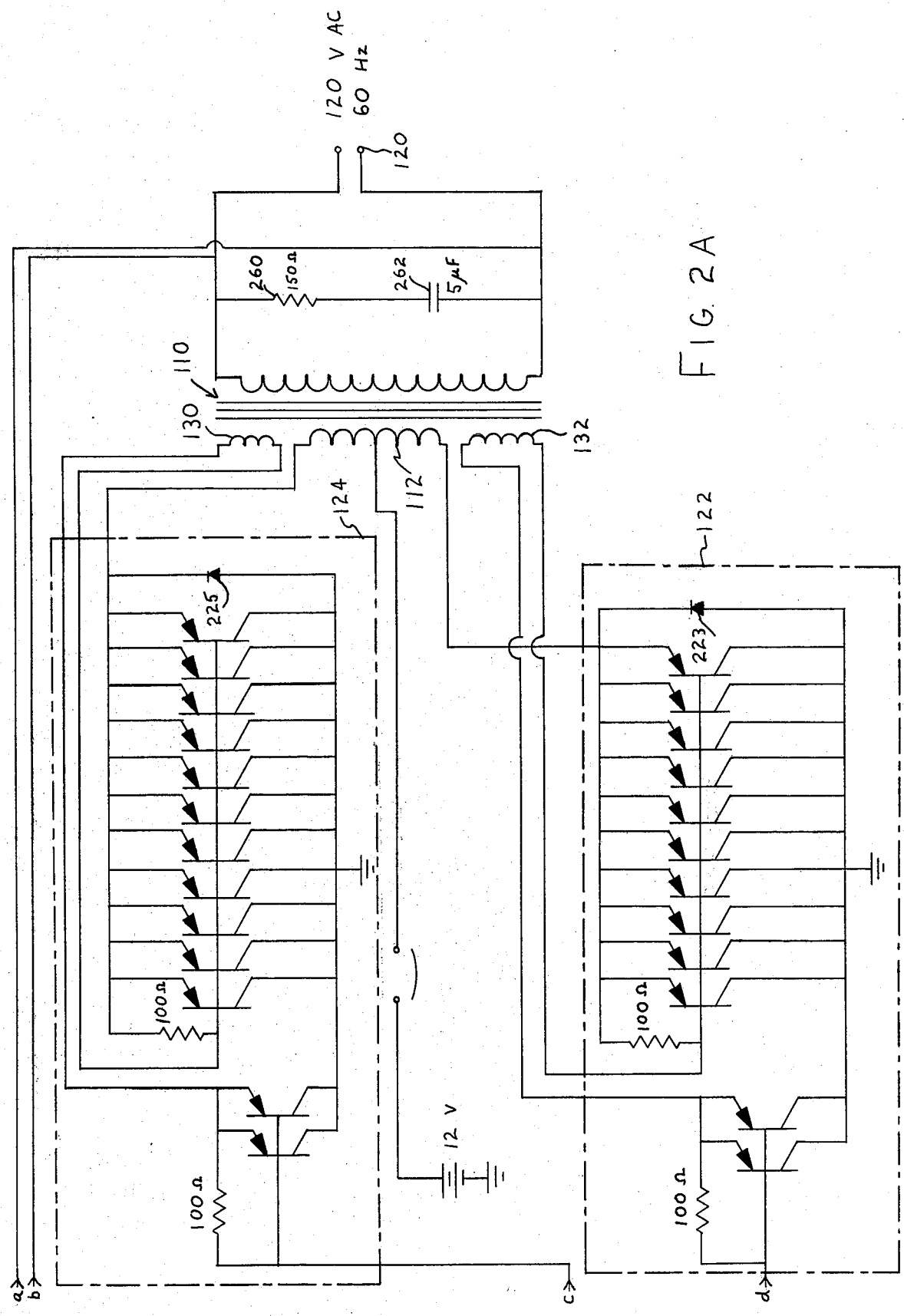
FIGS. 2A and 2B are detailed circuit diagrams of the preferred embodiment of the invention.

FIG. 2 illustrates the details of the preferred embodiment of the invention. It has a power transformer 110 with a center tap 118 connected to the DC power source 116. Its primary 112 is connected to two switching means 112 and 124. Each of the switching means comprises a Darlington pair having windings 130 and 132 connected as in the circuit of FIG. 1.

The circuit of FIG. 2 also has a pulse width modulation circuit 134, an RMS detector circuit 138 and a square wave generator 136. The square wave generator 136 is a crystal controlled oscillator utilizing a CD 4060DE integrated circuit. This chip also includes a divider 210 with an output 120 Hz square wave at its output pin 14.

The RMS detector circuit 138 has a voltage step-down transformer 218 which applies the stepped-down analogy of the output voltage from the secondary of the transformer 110 to a full wave rectifier circuit consisting of diodes 220 and 222. Diodes 224 and 226 provide full wave rectified power for powering the RC4200 integrated circuit at its power supply input terminals 203 and 206.

The full wave rectified signals from the diodes 220 and 222 are coupled to the input pins 1 and 8 of the integrated circuit RC4200. Therefore the signal at these input pins represents the absolute value of the output voltage from the inverter. The outputs of the RC4200 are applied to an integrator circuit 230. Because this particular RMS detector circuit is a prior art circuit, its operation is not discussed in detail. However, the output of the integrator is a DC signal at a level which is proportional to the RMS value of the AC output voltage at the output terminals 120.

The pulse width modulator 134 has three op-amps, op-amp 232 connected to form a comparator, op-amp 234 connected to form an integrator and op-amp 236 connected as an inverter for inverting the output of the RMS detector 138.

Figure 2B:
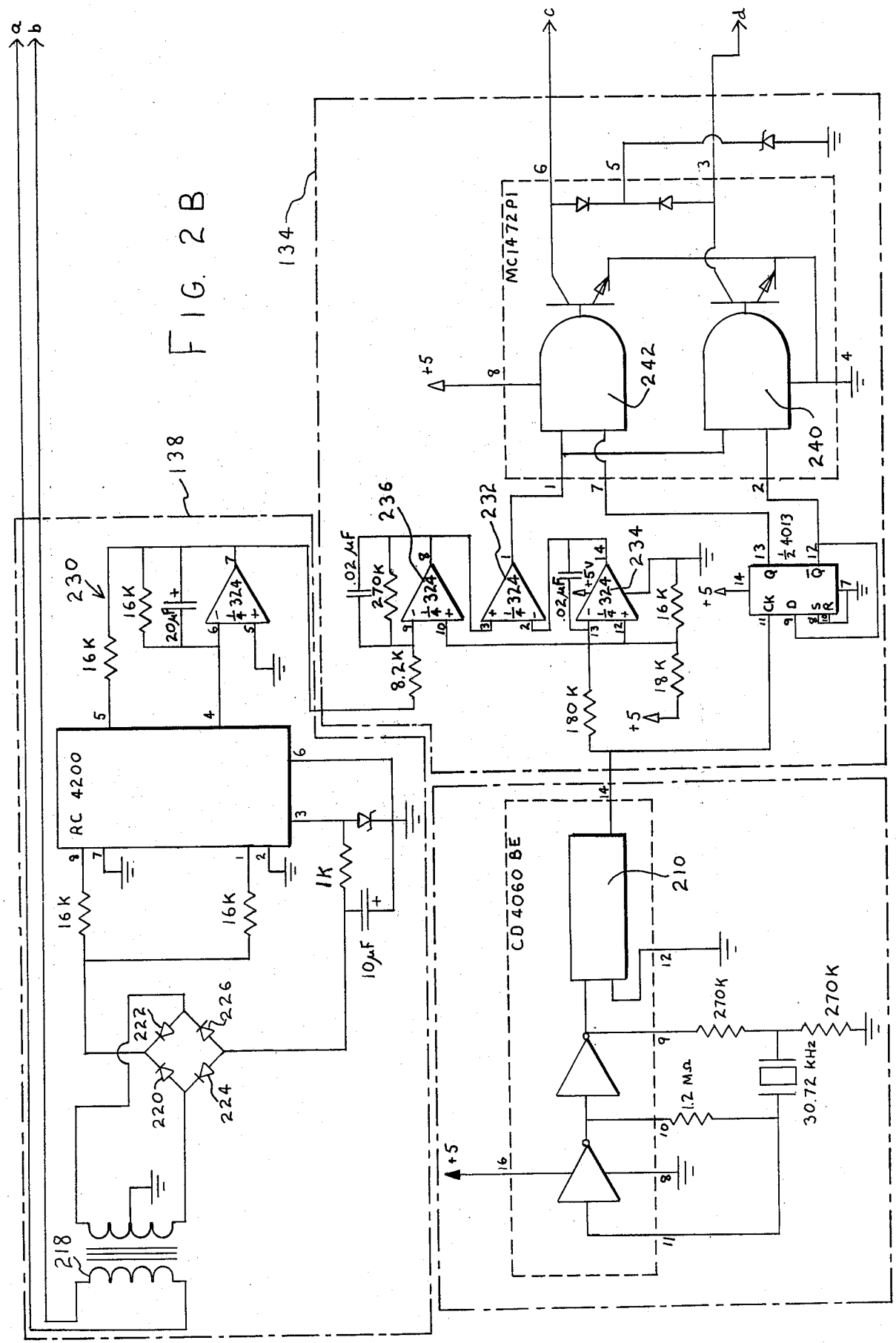

Referring to FIGS. 2B and 3, the 120 Hz square wave from pin 14 of the CD 4060BE is applied to the inverting input of op-amp 234 and to a D flip-flop 237 connected to divide the 120 Hz pulses by two and apply 60 Hz pulses to the AND gates 240 and 242 at opposite phases from the $\overline{Q}$ and Q outputs. Each of the AND gates is followed by an inverter so that together they operate as NAND gates. The 120 Hz output of pin 14 is integrated by the integrator circuit of op-amp 234 to provide the triangular wave of FIG. 3B which is applied to the non-inverting input of the comparator 232. Applied to the inverting input of the comparator 232 is the inverted output signal of the RMS detector circuit 138 also shown in FIG. 3B.

Whenever the level of the RMS signal exceeds the level of the triangle wave, the output of the comparator 232 shifts to one level. It shifts to the other level when the RMS signal is less than the triangular wave. Consequently, the output pulses from the comparator 232 are as shown in FIG. 3C and have a pulse width proportional to the level of the RMS detected signal.

The output of the comparator is applied to the other inputs of each of the AND gates 240 and 242. Thus, whichever of the AND gates 240 or 242 has a 60 Hz pulse applied to its input from the D flip-flop 237 will shift its level during the application of a pulse to its other input from the comparator 232. When no comparator pulse is present, neither AND gate will provide an output pulse. Thus, the outputs of the integrated circuit MC1472P1 are shown in FIG. 3F and 3G. These are applied to the Darlington pairs for switching them to alternately apply the DC source 116 to the primary of the transformer 110.

A series RC circuit having resistor 260 and capacitor 262 are shown shunted across the secondary of the transformer 110. FIG. 3H shows the voltage applied to the primary of the transformer 110 by the switching circuit from the DC source 116. If the RC circuit were not present then each time one of the switching means 112 or 124 is turned off, that is during the beginning of the interim interval 270, the collapse of the magnetic of the transformer 110 would cause an extreme excursion of the output voltage in the opposite polarity. However, this is prevented by means of the RC circuit of resistance 260 and capacitance 262. With this RC circuit, energy is stored not only in the magnetic field of the transformer but also in the capacitor 262. When the switching means is turned off and the resulting polarity reversal of the transformer primary occurs, the energy stored in the magnetic field is transferred back into the DC source 116. The energy stored in the capacitance 262 is applied to the output in accordance with the time constant of the decay circuit. Thus, the capacitance prevents an instantaneous voltage polarity reversal at the secondary of the transformer 110 so that the output polarity may make a relatively slow and smooth transition to the opposite polarity in the manner shown in FIG. 3I. As output loading increases, the time constant of the decay of energy from capacitance 262 is shortened.

Diodes 223 and 225 provide current paths for the same reason as diodes 23 and 25 of FIG. 1. However, the diodes 223 and 225 carry a relatively high current, such as 50 amps, and therefore are diodes which turn on relatively slowly compared to the fast switching rise times of the circuit. Since the diodes can not turn on as fast as the voltage can rise across them and their parallel output switching transistor, it is necessary to protect the transistors with additional circuitry to prevent a voltage spike across these parallel circuit elements from reaching the breakdown voltage of the transistor before the diode turns on. Such a voltage spike is prevented by the circuit of zener diode 243 and diodes 245 and 247.

The zener diode 243 together with the diode 245 clamps the emitters of the output transistors of switch 122 at a voltage below the transistor breakdown voltage and above twice the supply voltage (which is the maximum operating voltage across the output transistor). The zener diode 243 together with the diode 247 similarly clamps the emitter of the output transistors of the switch 124.

Clamping is accomplished because the zener diode will conduct when the voltage at the emitter of the output transistor exceeds the sum of the zener voltage and the voltage drops across the junctions and circuit elements along the path between that emitter, through the zener diode to ground. Current will be conducted along that path and the emitter voltage can not exceed the sum of those voltage drops.

The advantage of that circuit is that voltage spikes above the transistor breakdown voltage are prevented by an inexpensive low current zener diode in the low power part of the circuitry rather than the conventional technique of shunting the transformer with an expensive high current zener diode.

From the above it can be seen that the use of the RMS detector circuit provides regulation based on the particular output parameter, RMS voltage, to which most electrical appliances which are powered through the inverter are most responsive.

The energy which is fed back from the small windings 130 and 132 has a positive feedback effect. The switching of a switching means 122 or 124 to an on state does not produce an instantaneous change of current through the transformer. However, the rapid increase of the current when a switching means is initially turned on causes energy to be coupled into the Darlington circuit which further aids in further turning on the transistor switching means. This bootstrap operation similarly aids in turning off the transistor switching means. Therefore, when a transistor switch is turned on it is brought quickly through the linear region to saturation. This quickly minimizes the energy dissipated in the transistor switch and permits it to operate at a cooler junction temperature. The transistor is cut off quickly with the same desirable results.

The output switching transistor of FIG. 2 is actually ten parallel connected transistors for increased current capability. The small windings in each Darlington pair generate enough offset voltage to drive the bases of these parallel switching output transistors below ground when driving these output transistors to saturation. The circuit quickly reaches the minimum saturation voltage and that saturation voltage is less than that usually obtained with a single output transistor. Current will be relatively uniformly distributed among them in spite of any minor differences in their characteristics.

We have found for example that at saturation in the intermediate operating ranges, the emitter to collector voltage of the output switching transistor is only a few millivolts above ground. In FIG. 3J I have shown an approximate representation of the typical collector to emitter voltage for an inverter designed to operate over a range of 0 to 1,000 watts.

It should be noted that the techniques of coupling energy into the input circuit of the switching transistor to provide an offset voltage can also be effectively utilized for switching circuits which do not utilize the Darlington connection. Additionally, other devices which are capable of coupling energy into the input circuit of the switching transistor in response to a signal which is proportional to output current of the power circuit may also be used equivalently.

I claim:

1. In an inverter circuit of the type including a transformer having a center tapped primary to which a dc source is connected, a pair of push-pull connected bipolar transistor switching means connected to the ends of said primary for alternately applying said dc source to opposite halves of said primary, said switching means each having a control input, and a control means connected to said control inputs to control the alternate switching of said switching means, the improvement comprising:
a pair of windings, magnetically coupled to said transformer, a different one of said pair of windings connected in series with the control input circuit of each of said switching means, wherein each of said switching means comprises a pair of Darlington-connected bipolar transistors having said winding as the circuit element connecting the base of the output one of a said Darlington pair to the output of the input one of said Darlington pair.

2. An inverter circuit in accordance with claim 1 wherein said Darlington pairs are connected in a common collector circuit configuration.

3. An inverter circuit in accordance with claim 2 wherein said windings are connected in a polarity for positive feedback said Darlington pairs and have magnetic coupling for applying an induced voltage which is at least equal to the sum of the characteristic base-emitter junction voltages of the transistors of each of said pairs.

4. An inverter in accordance with claim 3 wherein a diode is shunted across the output switching terminals of each of said Darlington pairs and having a conduction polarity opposite to that of its associated parallel transistor.

5. An inverter in accordance with claim 4 wherein a pair of series connected diodes having their like terminals connected at their intermediate node are connected across the control inputs of said switching means and a zener diode is connected between said node and ground for clamping the output of said switching means below its breakdown voltage.

6. An inverter in accordance with claim 4 wherein said control means includes a time delay interval after turning off one switching means and before turning on the other and wherein a series resistance and capacitance are shunted across the output secondary of said transformer having a time constant which is substantial with respect to said time interval.

7. In an inverter of the type including a transformer to which a DC voltage is periodically applied by switching means, pulse width modulating control means for maintaining a constant AC output voltage by controlling the on-time of said switching means in response to output voltage, said pulse width modulating control means being responsive to the difference between a reference signal and the level of a feedback signal at the output of a feedback circuit, the signal being derived from the AC output voltage, the improvement comprising an RMS voltage detector circuit means as said feedback circuit, said RMS voltage detector converting the AC output voltage to a voltage level which is proportional to the RMS value of the output voltage.

8. In an inverter of the type including a transformer having the inverter output at its secondary and having a primary to which a DC voltage is periodically applied through at least one bipolar transistor switching means said inverter also having a square wave generator and a pulse width modulating controlling means connected to said square wave generator for maintaining a constant AC output voltage by controlling the on-time of said switching means, the improvement comprising:
(a) an output voltage detector circuit means connected to said secondary and the controlling means for detecting a signal which is proportional to the RMS value of the output voltage at said secondary for modulating the width of the pulses periodically applied to said primary; and
(b) at least one offsetting voltage source having an output connected to the input circuit of said transistor switching means and its input coupled to a source for providing a voltage which opposes the base-emitter junction voltage of the transistor switching means to reduce the emitter to collector voltage across the transistor switching means.

9. An inverter in accordance with claim 8 wherein said voltage source comprises an additional winding on said transformer.

10. An inverter in accordance with claim 9 wherein said inverter is a push-pull type having two of said transistor switching means each comprising a Darlington pair in a common collector configuration and wherein there are two of said windings each being connected between the base of the output of different ones of said Darlington pair and the emitter of the input one of different areas of said Darlington pair.

11. An inverter circuit comprising:
(a) a transformer having a center tapped primary;

(b) a DC source connected to the center tap of said primary;

(c) a pair of switching transistors connected to the ends of said primary and said DC source for switching current to said primary;

(d) a pair of windings magnetically coupled to said transformer and each connected to the input circuit of a different one of said switching transistors and having coupling selected to generate a voltage for opposing the input junction voltage of said switching transistor;

(e) an RMS detector circuit means having its input connected to the circuit of said secondary and having an output proportional to the RMS value of the inverter output voltage;

(f) a pulse generator; and (g) a pulse width modulator connected to said pulse generator and said RMS detector circuit means for modulating the width of said pulses around a selected operating width in response to the difference between a reference signal and the output of said RMS detector circuit means.

* * * * *